Figure 1:
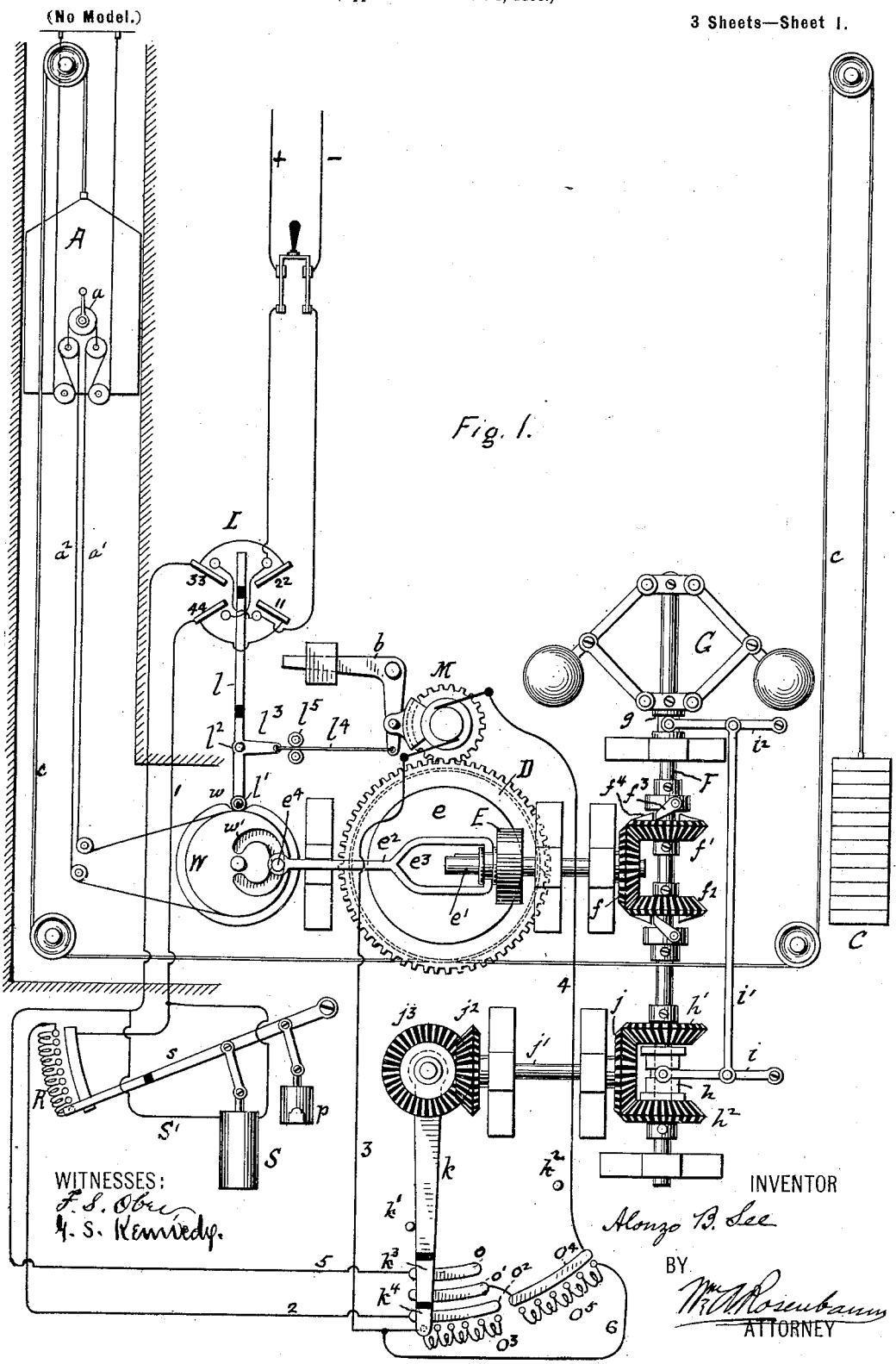

No. 651,672. Patented June 12, 1900.
A. B. SEE.
ELECTRIC ELEVATOR.
(Application filed Nov. 3, 1899.)
(No Model.) 3 Sheets—Sheet 1.

WITNESSES:
F. S. Ober
H. S. Kennedy

INVENTOR
Alonzo B. See
BY
W. R. Rosenbaum
ATTORNEY

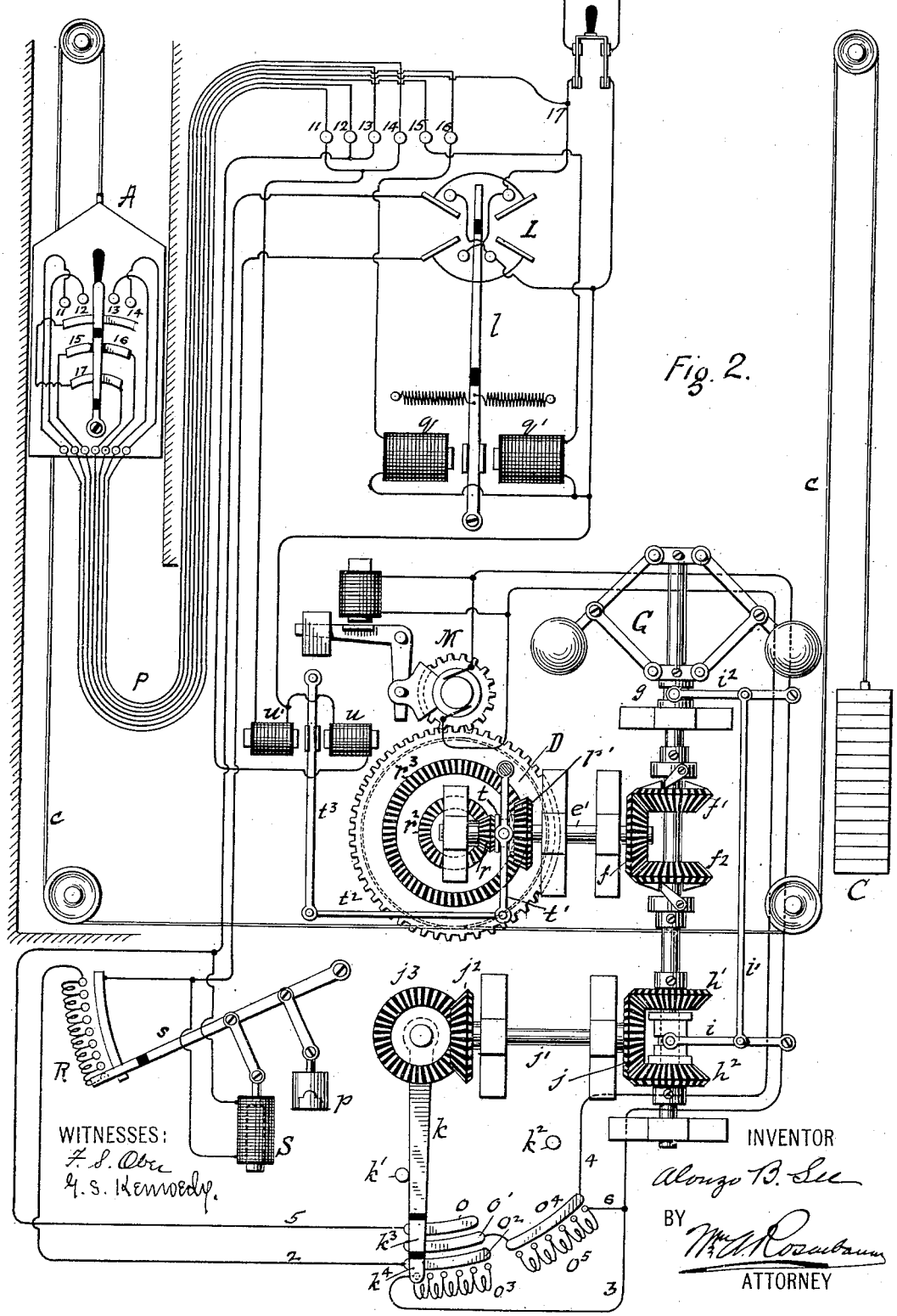

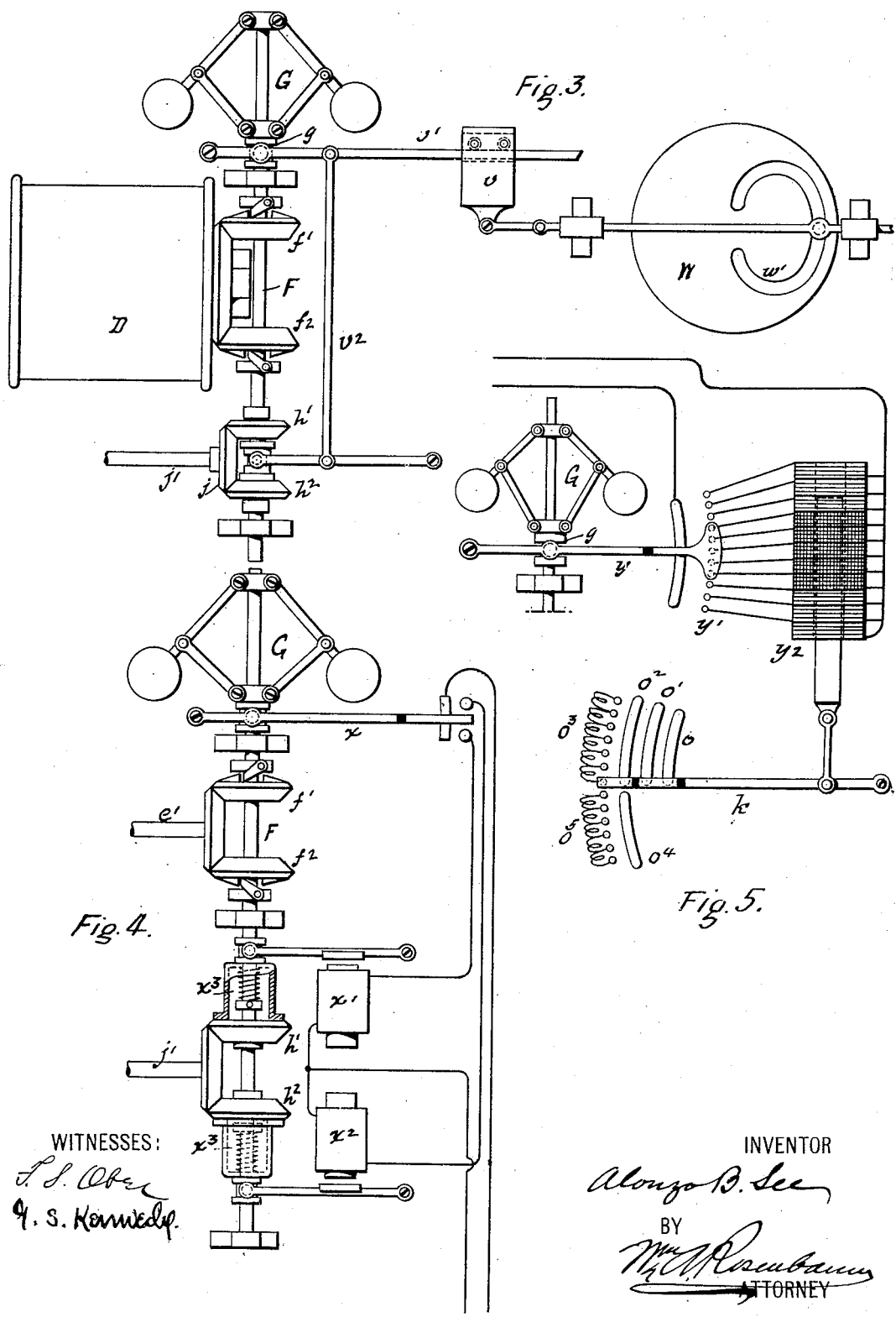

UNITED STATES PATENT OFFICE.

ALONZO B. SEE, OF NEW YORK, N. Y., ASSIGNOR TO HIMSELF AND WALTER L. TYLER, OF SAME PLACE.

ELECTRIC ELEVATOR.

SPECIFICATION forming part of Letters Patent No. 651,672, dated June 12, 1900.

Application filed November 3, 1899. Serial No. 735,725. (No model.)

*To all whom it may concern:*

Be it known that I, ALONZO B. SEE, a citizen of the United States, residing at the city of New York, in the borough of Brooklyn and State of New York, have invented certain new and useful Improvements in Electric Elevators, of which the following is a full, clear, and exact description.

This invention relates to the control of electric elevators, hoisting apparatus, and other machinery driven by an electric motor, and has special reference to plants in which at times the actuating-machine may be doing work as a motor and at other times may be consuming power as a generator. My invention being particularly applicable to electric elevators will be described in connection with such a machine.

The present approved practice of operating electric elevators is to counterbalance the weight of the car to such an extent that the average load upon the motor will be as small as possible. For instance, a car weighing two thousand pounds will be counterbalanced by a weight of two thousand pounds plus the weight of the average load, so that with the average load on the motor would simply have to overcome the friction of the working parts to move the car in either direction; but if the load is below the average then the car would be lifted by the counterweight and work would have to be done by the motor to lower it, and if the load on the car is above the average work would have to be done by the motor to lift it, while it would be lowered by its own preponderating weight. Hence the actuating electric machine, which, it will be understood, is geared positively to the hoisting-drum, is sometimes acting as a motor in lifting the car or lowering it, while at other times it is being driven as a generator when the car is moving either up or down. In controlling the speed of an electric machine operating in this way the difficulty encountered is the fact that the operator has no knowledge as to which of these two capacities the machine is running under at any particular time. It cannot be left to him to guess as to whether he is carrying a load above or below the average, and even if the operator's judgment could be relied upon for this it would be necessary for him to manipulate one or the other of two speed-controlling devices in the car, besides perhaps the ordinary stopping and starting device, which would be confusing and impractical.

For the reasons mentioned above electric elevators operated at high speeds have not been a success up to the present time. Low-speed elevators are more successful because the ordinary stopping and starting automatic rheostat can be used to make a gentle and accurate stop at landings while the car is permitted to run at full speed between landings; but in high-speed service the slowing down for a landing afforded by the ordinary automatic rheostat, if such were used, would be too sudden and the stop would be unpleasant, if not actually injurious, to the passengers. Besides the operator must act with great precision in making a landing, or otherwise he will stop short of it or be carried beyond it, thus causing waste of time. It is essential, therefore, in high-speed elevators to provide means whereby the operator can easily vary the speed of the car at pleasure, and thus enable him not only to travel between landings at any desired rate, but even at and from the highest speed to be able to gradually slow down and finally come to a gentle stop exactly at the landing-place. In other words, the control of an electric elevator should be as simple and perfect as the control of the hydraulic elevator. In the hydraulic system the movement of a lever or rope over a certain distance effects a corresponding change in the speed of the car and the further movement, step by step, over the full range of movement effects corresponding increase or decrease in the speed. This accomplishment is the object of my invention, which will now be described in detail, with reference to the accompanying drawings, in which—

Figure 1 is a conventional and diagrammatic representation of an electric elevator operated according to my invention, the control from the car being mechanical. Fig. 2 is a similar view of the same apparatus, with the exception that electric control from the car is substituted for the mechanical control. Figs. 3, 4, and 5 illustrate modifications of the manner of operating the governor and of utilizing the movements of the governor.

Referring first to Fig. 1 for a general description of the invention, A indicates the elevator-car, D the winding-drum, and M the actuating-machine positively geared to the drum either by spur-gearing, as shown, or by the usual worm-gearing. C is a counterweight to balance the car and its load and which we will assume to be somewhat heavier than the weight of the car, but lighter than that of the car and its maximum load. The counterweight is supported at one end of the cord $c$, while the car is attached to the other end, the intermediate portion of the cord being wound in a loop around the winding-drum D.

For mechanical control by the operator the car is provided with a hand-wheel $a$, by rotating which either of two cords $a'$ $a^2$ is pulled. These cords are looped around a wheel W, on the periphery of which is a notch $w$ and in one of the faces of which is an eccentric groove $w'$. The middle portion of this groove is near the periphery of the wheel, while the two ends curve from the middle toward the center, that portion of the groove lying next to the periphery being for a short distance concentric with the wheel. The notch $w$ receives a roller $l'$ on the end of a lever $l$, pivoted at $l^2$. The opposite end of this lever is adapted to engage with electrical contacts 11, 22, 33, and 44 to the right or left of a center in order to start the elevator in one direction or the other. In other words, this lever and the contacts constitute a mak-eand-break pole-changing switch L. The lever is caused to swing to the right or to the left by the rotation of the wheel W in one direction or the other, causing the shoulders of the notch to force the pulley onto the periphery of the wheel, where it will ride without changing the condition of the switch until the notch is again presented to it. When the elevator is at rest, the roller is in the notch and the lever occupies the central position shown. This lever also carries a right-angled projection $l^3$, to which is attached a flexible strap $l^4$, passing between guide-rollers $l^5$ to the end of a bell-crank brake-lever $b$, one arm of which carries a brake-shoe engaging with a pulley on the shaft of the electric machine, while the other arm carries a weight tending to throw the brake into engagement with the said pulley and also acting to move the switch-arm into the notch when it is presented. For stopping and starting the machine the ordinary apparatus is used, consisting of solenoids S in the main circuit, whose core is connected with a lever $s$, adapted to move over the row of contacts of a rheostat R, a dash-pot $p$ being used to control the movement of the arm.

Upon the head of the drum D or upon the face of a rotary part moving at a predetermined speed to the drum is a frictional surface $e$, upon which bears a friction-wheel E. This friction-wheel is feathered to a shaft $e'$, which occupies a radial position with respect to the surface $e$. The wheel E is adapted to slide on its shaft toward and away from the center of the frictional surface against which it bears. For effecting the movement of this friction-wheel it is connected to a link $e^2$ by means of a yoke $e^3$, said link carrying a roller $e^4$, which stands in the eccentric groove $w'$ in the face of wheel W, from which it will be seen that rotation of wheel W will cause the reciprocation of the link $e^2$. Shaft $e'$ is mounted in suitable bearings and carries a bevel-pinion $f$, engaging with two similar pinions $f'$ $f^2$, loosely mounted on a vertical shaft F. As the pinions $f'$ $f^2$ engage with the opposite sides of pinion $f$, they will be driven in opposite directions by the latter pinion. Above the pinion $f'$ is a collar fixed to the shaft and carrying a pawl $f^3$, adapted to engage with shoulders $f^4$ on the pinion, and thus cause the shaft to turn with the pinion when the pinion rotates in a certain direction. Below pinion $f^2$ is a similar arrangement of pawl and shoulders, the pawl being arranged to engage with the shoulders when the rotation of the pinion is such that the other pawl will slide freely. Thus the shaft F will always be rotated in the same direction by the shaft $e'$ regardless of the reversals of motion of the latter shaft. On shaft F there is also an ordinary ball-governor G with its sliding collar $g$; also, a sleeve $h$, having a clutch-face of any suitable character at each end and adapted to be thrown into engagement with either of two loose bevel-pinions $h'$ $h^2$, which are provided with corresponding clutch-faces for this purpose. The sleeve is moved into engagement with one or the other of the pinions by the governor through the agency of a lever $i$, a link $i'$, and another lever $i^2$. The two pinions $h'$ $h^2$ engage with the opposite sides of a pinion $j$ on a shaft $j'$, which also carries another pinion $j^2$, engaging with pinion $j^3$, so that if one of the pinions $h'$ $h^2$ is connected to its shaft by the clutch the pinion $j^3$ will be rotated in one direction, and if the other one of the pinions $h'$ $h^2$ is connected with its shaft pinion $j^3$ will be rotated in the opposite direction. Pinion $j^3$ carries an arm $k$, which travels between two stops $k'$ and $k^2$. Its outer end is formed by two insulated sections $k^3$ $k^4$, the former of which is adapted to slide in contact with two metallic plates $o$ $o'$, which it bridges, and the latter to slide in contact with a plate $o^2$ and a set of resistance-contacts $o^3$. The section $k^4$ is also adapted to slide over and bridge the plate $o^4$ and the set of contacts $o^5$, this second plate and set of contacts following immediately after the first in the stroke of the arm.

The electrical circuits and connections are as follows: The supply-mains, plus and minus, lead into the stopping, starting, and reversing switch L, thence by wire 1 to the rheostat R and wire 2 to plate $o^2$. Another wire 3 leads from the first contact of the set $o^3$ to one brush of the motor M. From the other brush a wire 4 leads to the plate $o^4$ and also to the plate $o'$. Another wire 5 leads from plate $o$ back to the main switch L. The set of contacts $o^5$ connects with wire 3 by branch wire 6. The main solenoid S is in a shunt-circuit S' from the wires 1 5.

The operation is as follows: When the elevator is at rest, the parts are in the position shown in Fig. 1. To start the car, the operator pulls on one or the other of the cords $a'$ $a^2$, depending upon which direction he wishes the car to move. This will throw off the brake from the motor and close the main circuit at the switch L, leaving roller $l'$ on the circular periphery of wheel W. If the extent of rotation of wheel W does not result in pulling the friction-wheel E toward the center of the drum, said friction-wheel will approach its maximum speed very rapidly and its motion will be imparted to shaft F, which will cause the governor-balls to fly out and connect one of the pinions $h'$ $h^2$ to shaft F, and so cause the arm $k$ to move over the electrical contacts and slow down the machine at once in the manner hereinafter described. If, therefore, the operator expected to make only a short run before stopping, he would operate in this way; but if he expected to make a long run and wished to move at the highest speed he would throw the lever over to the full limit, which would result not only in closing the main circuit at switch L, but also in pulling the friction-wheel E to its inner position near the center of the drum, where it would be driven at its slowest speed. The governor-balls are so set that at this slow speed they will not perform their intended function. Consequently the electric machine will run up to its full speed, which may be, say, from four to six hundred feet per minute. If the operator now wishes to slow down to make a landing or for any other purpose, he will move the hand-lever in the reverse direction to an extent corresponding with the amount of reduction in speed desired. This movement causes the eccentric groove in wheel W to move the friction-wheel E toward the circumference of the frictional surface on the drumhead, which will increase the rotary speed of the friction-wheel and of its shaft and the shaft F and will cause the governor-balls to fly outward, which in turn will close the clutch $h$ $h'$ and cause arm $k$ to travel toward the right. Now if the electric machine is running as a motor this travel of arm $k$ will throw the resistance $o^3$ into the motor-circuit, the current being traced as follows: wire 2, plate $o^2$, bridging-section $k^4$, resistance $o^3$, wire 3, the motor-armature, wire 4, plate $o'$, bridging-section $k^3$, plate $o$, and wire 5. This resistance will slow down the motor to a speed which will drive the friction-wheel E at the same speed at which it was driven when located at its innermost position near the center of the drumhead. When the friction-wheel has thus been slowed down to its normal speed, the governor will open the clutch $h'$ and leave the resistance $o^3$ in circuit, and consequently maintain the reduced speed of the machine. If it so happened that the electric machine was running as a generator, the arm $k$ in passing over the resistance $o^3$ would have no effect on the machine, and so would continue on until it entered upon the resistance $o^5$ and plate $o^4$, whereupon it will be seen that the main circuit would be broken and the electric machine would be running on a closed short circuit through the resistance $o^5$, the circuit being traced as follows: from one of the brushes of the machine through wire 4, plate $o^4$, bridging-section $k^4$, resistance $o^5$, wire 6, and wire 3 to the other brush. The generator running in this way would build up its field magnetism and choke down its speed until the friction-wheel E again runs at its normal speed, whereupon the clutch would be opened and the arm $k$ left at the point it reached and the speed of the elevator maintained at the lower predetermined rate. The operator on the car can repeat this operation of reducing the speed step by step until a speed is reached where he can with safety throw his lever clear over to the stopping (starting) point and break the main circuit by allowing the roller $l'$ to enter the notch $w$ in wheel W. The solenoid S will then be sufficient to make an easy and accurate stop. It will be observed that the wheel E reaches its outer position before the notch $w$ is presented to the circuit-breaking lever on account of the concentric portion of the groove $w'$. Consequently the governor will slow down below the normal speed and will throw in the clutch $h'$ $h^2$, which will reverse the arm $k$ and carry it back to the starting-point during the time it takes the brake to bring the machine to a complete stop. It will be seen that when the switch-lever $l$ is thrown in either direction the brake-shoe is removed from the motor-shaft, and likewise upon a restoration of the lever to its central position, where the current is cut off, the brake is applied.

I will now proceed to describe various modifications of the apparatus for carrying out the principle of my invention, it being obvious at once that wide variations may be made in the apparatus without departing from the spirit of the invention.

In Fig. 2 I have illutrated the circuits and apparatus for electrical control from the car wherein the work done by the wheel W is accomplished by electromagnets. The car is fitted with a number of contacts numbered, respectively, 11, 12, 13, 14, 15, 16, and 17, arranged in two sets, one to the right and the other to the left, and adapted to be engaged by a hand-lever, respectively, for sending the car up or down. These contacts connect through a flexible cable P with correspondingly-numbered terminals on a switchboard adjacent to the operating machinery. The lever $l$ is held in its central position by two springs; but magnets $q$ $q'$ on opposite sides thereof are adapted to throw the lever to one side or the other and hold it to deliver current to the electric machine. Instead of the frictional engagement between the wheel E and the drumhead I have shown here two bevel-gears $r\ r'$, arranged at different positions on a radius of the drumhead, either of which is adapted to be locked to the shaft $e'$ by a clutch device $t$, located between them. The pinions $r\ r'$ engage, respectively, with two gears $r^2\ r^3$ on the drumhead of different diameters. The clutch is operated by a lever $t'$, link $t^2$, and armature-lever $t^3$, the necessary reciprocating motion of the same being obtained by two electromagnets $u\ u'$ on opposite sides of the lever $t^3$, one of the magnets serving to connect wheel $r$ with the drum and the other to connect wheel $r'$ therewith. This positive connection between the shaft $e'$ and the drum necessitates a definite division of speeds and in the arrangement shown affords only two variations as against an infinite number of variations afforded by the frictional engagement illustrated in Fig. 1. By tracing the circuits from the car it will be seen that either of the magnets $u\ u'$ may be energized simultaneously with either of the magnets $q\ q'$. The other devices shown in Fig. 2 are the same as those shown in Fig. 1 and the operation is the same as before, except that the main switch is moved by the magnets instead of by the wheel W, and the speed of the governor is changed also by magnets instead of by the wheel W.

In Fig. 3 the governor-shaft is shown geared directly to the drum-head instead of through the interposed shaft $e'$, and instead of speeding up the governor-shaft to obtain a movement of the governor-balls I provide a weight $v$, adapted to slide on a lever $v'$, which is connected with the sliding collar of the governor. When the weight is pushed inward, the balls fly out and set the controller into operation through the link connection $v^2$. When the speed has been thus reduced, the balls lower and stop the movement of the controller. The weight is shifted upon its lever by the wheel W and its eccentric groove, (shown in Fig. 1;) but it will be understood that any other mechanical device for shifting the weight may be utilized. In this device there is a variation of the movement of the governor created by the operator without varying its speed, the resistance to the centrifugal movement of the balls being made more or less.

Fig. 4 shows another way of utilizing the motion of the sliding collar of the governor to operate the clutches $h\ h'\ h^2$. The motion of the collar is transmitted to a lever $x$, which closes the circuit of one or the other of two magnets $x'\ x^2$. The armature-levers of these magnets are respectively connected with the clutches, and springs $x^3$ are used to open the clutches when the current is broken. The magnets may be connected in a shunt-circuit from the main circuit or in an entirely-independent circuit.

Fig. 5 shows a more direct method of imparting a movement to the arm $k$. The movement of the sliding collar of the governor is communicated to a lever $y$, which moves over a series of contacts $y'$, controlling the circuit through a number of sections on a solenoid $y^2$. The core of the solenoid is connected to the lever $k$. The end of lever $y$ covers a number of contacts simultaneously and in moving shifts the magnetized zone of the solenoid and so effects a corresponding movement of the core and arm.

In those instances where the arm $k$ or its equivalent is driven by gearing, as in Figs. 1 to 4, it is not essential that the power should be taken from the drum or governor-shaft. It may be driven from an entirely-independent source. A special motor may be used to move the arm, the other mechanism being used to stop, start, and reverse such motor.

Having described my invention, I claim—

1. The combination of an electric machine adapted to run either as a motor or generator, a speed-controller for said machine consisting of a traveling switch-arm and two sets of electrical contacts arranged in succession along the path of movement of said arm, one of said sets controlling the machine when acting as a motor and the other controlling it when acting as a generator, a moving member connected with the electric machine to be driven therewith, means for varying the motion of the moving member, and means whereby such variation will cause the traveling switch-arm of the speed-controller to move, substantially as described.

2. The combination of an electric machine adapted to run either as a motor or generator, a speed-controller for said machine consisting of a traveling switch-arm and two sets of electrical contacts arranged in succession along the path of movement of said arm, one of said sets controlling the machine when acting as a motor and the other controlling it when acting as a generator, a moving member connected with the electric machine to be driven therewith, manually-operated means for varying the motion of the moving member and means whereby such variation will cause the traveling switch-arm of the speed-controller to move, substantially as described.

3. The combination of an electric machine adapted to be run either as a motor or generator, a speed-controller for said machine, a centrifugal governor connected with the electric machine to be driven therewith, a variable-speed gear between the electric machine and the electric governor, a device for automatically driving the centrifugal governor in one direction regardless of the direction of rotation of the electric machine, gearing between the speed-controller and the governor-shaft, two clutches for determining the direction of movement of the speed-controller and connections between the clutches and the centrifugal governor whereby they are opened and closed by the governor, substantially as described.

4. In an electric elevator, the combination of a counterbalanced car, an actuating electric machine therefor adapted to run either as a motor or generator, a speed-controller for said machine, a moving member connected with the electric machine to be driven therewith, means whereby the operator in the car can vary the motion of the moving member, and means whereby such variation will affect the speed-controller.

5. In an electric elevator, the combination of a counterweighted car, an actuating electric machine adapted to run either as a motor or generator, a speed-controller for said machine, a centrifugal governor connected with the electric machine adapted to be driven therewith, manually-operated devices in the car for varying the motion of the centrifugal governor and means whereby such variation will affect the speed-controller.

6. In an electric machine, the combination of a counterweighted car, an actuating electric machine adapted to run either as a motor or generator, a speed-controller for said machine, a rotary shaft connected with the electric machine to be driven therewith, manually-operated means in the car for altering the speed of the rotary shaft with reference to that of the electric machine, and means whereby such alteration of speed will affect the speed-controller, substantially as described.

7. In an electric elevator, the combination of a counterbalanced car, an actuating electric machine adapted to be run either as a motor or generator, a speed-controller for said machine, a moving member connected with the electric machine to be driven therewith, a variable-speed gear between the electric machine and the moving member, mechanism operated from the car for shifting the variable-speed gear, and means whereby the variations of the motion of the moving member will affect the controller.

8. In an electric elevator, the combination of a counterbalanced car, an actuating electric machine adapted to be run either as a motor or generator, a speed-controller for said machine, a moving member connected with the electric machine to be driven therewith, means for varying the motion of the moving member, said means consisting of a reciprocating rod, a wheel provided with an eccentric groove in which the end of said rod works, and connections between the wheel and the car whereby the wheel may be rotated by the operator in the car, substantially as described.

9. In an electric elevator, the combination of a counterweighted car, an actuating electric machine adapted to run either as a motor or generator, a speed-controller for said machine, gearing between the speed-controller and the actuating-machine, and means controlled from the car for connecting and disconnecting the controller with the machine.

10. In an electric elevator, the combination of a counterweighted car, an actuating electric machine adapted to run either as a motor or generator, a speed-controller for said machine, means operated from the car for starting said speed-controller into operation, and automatic means for stopping said controller, substantially as described.

11. In an electric elevator, the combination with the car of an electric actuating machine, a speed-controller therefor means operated from the car for throwing said speed-controller into operation, and means for automatically throwing said controller out of operation when the desired change of speed has been attained.

12. In an electric elevator, the combination of the car, an actuating electric machine, a speed-controller for said machine means operated from the car for successively throwing said speed-controller into operation, and means for automatically throwing the speed-controller out of operation in each instance when the desired speed for each operation has been attained.

13. In an electric elevator, the combination of a friction-disk driven with the actuating-machine, a friction-wheel in engagement with said disk and movable toward and away from the center thereof, a centrifugal governor connected with the friction-wheel, a speed-controller for the machine adapted to be thrown into and out of operation by the centrifugal governor, and devices operated from the car for shifting the friction-wheel, substantially as described.

14. In an electric elevator, the combination of the car, the actuating electric machine, a friction-disk driven therewith a friction-wheel in engagement with the disk and adapted to be moved toward and away from its center, a centrifugal governor geared to said friction-wheel, means whereby the governor will be caused to rotate in but one direction notwithstanding reversals of rotation of the friction-wheel, a speed-controller for the electric machine thrown into and out of operation by the governor, and means operated from the car for shifting the position of the friction-wheel, substantially as described.

15. In an electric elevator, the combination of the car, the actuating electric machine, a centrifugal governor positively geared to the actuating-machine, a speed-controller for the actuating-machine which is itself thrown into and out of operation by the centrifugal governor, and means operated from the car for changing the condition of the governor, substantially as described.

16. In an electric elevator, the combination of the car, the actuating electric machine, a starting and stopping rheostat therefor, a separate speed-controller having a graduating movement, and means operated from the car for operating the rheostat and controller, substantially as described.

17. In an electric elevator, the combination of the car, the actuating electric machine, a main circuit including a stopping and starting rheostat, a speed-controlling rheostat and the actuating-machine in series, a second normally-open short circuit including the actuating-machine, a controller operating successively the speed-controlling rheostat and the short circuit, and means operated from the car for throwing the speed-controller into operation.

18. In an electric elevator, the combination of the car, the actuating electric machine, a main circuit including a stopping and starting rheostat, a speed-controlling rheostat and the actuating-machine in series, a second normally-open short circuit including the actuating-machine, a controller operating successively the speed-controlling rheostat and the short circuit, means operated from the car for throwing the speed-controller into operation, and means operating automatically for throwing the speed-controller out of operation when a desired speed has been attained.

19. In an electric elevator, the combination of the car, the actuating electric machine, a main switch controlling current to the electric machine, a stopping and starting automatic rheostat, a separate speed-regulating rheostat divided into two parts, one of which is for controlling the speed when the electric machine is acting as a motor and the other of which is to control the speed of the machine when it is acting as a generator, a traveling switch-arm operating both parts of the speed-controller, a centrifugal governor mechanically connected with the electric machine, a variable-speed gear interposed between the centrifugal governor and the electric machine, means whereby variations of motion of the centrifugal governor will stop and start the traveling switch-arm of the speed-controller, and means operated from the car for changing said variable-speed gear, substantially as described.

20. The combination of an actuating electric machine, a rotary member connected to and driven therewith, a centrifugal governor connected to the rotary member, means for altering the speed of the rotary member, a speed-controller for the electric machine and connections between the centrifugal governor and the speed-controller whereby when the speed of the rotary member is altered the speed-controller is operated.

21. In an electric elevator, the combination of the car, the electric actuating-machine, a speed-controller therefor, a main switch controlling the circuit to the motor, a main-switch lever, a brake for the motor connected with and operated by the switch-lever, a pulley adapted to be rotated in either direction from the car and to move the switch-lever, a reciprocating rod obtaining its motion from said wheel, a centrifugal governor connected to and driven with the electric machine, and connections between the reciprocating rod and the governor whereby the latter may be caused to perform its governing function, substantially as described.

In witness whereof I subscribe my signature in presence of two witnesses.

ALONZO B. SEE.

Witnesses:
GEO. S. KENNEDY,
FRANK S. OBER.